United States Patent
Tzirkel-Hancock et al.

(10) Patent No.: US 9,390,713 B2
(45) Date of Patent: Jul. 12, 2016

(54) SYSTEMS AND METHODS FOR FILTERING SOUND IN A DEFINED SPACE

(71) Applicant: GM GLOBAL TECHNOLOGY OPERATIONS LLC, Detroit, MI (US)

(72) Inventors: Eli Tzirkel-Hancock, Ra'Anana (IL); Igal Bilik, Rehovot (IL); Moshe Laifenfeld, Haifa (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 206 days.

(21) Appl. No.: 14/022,978

(22) Filed: Sep. 10, 2013

(65) Prior Publication Data

US 2015/0071455 A1 Mar. 12, 2015

(51) Int. Cl.
*G10K 11/16* (2006.01)
*G10L 15/20* (2006.01)
*G10L 21/0216* (2013.01)

(52) U.S. Cl.
CPC ....... *G10L 15/20* (2013.01); *G10L 2021/02166* (2013.01)

(58) Field of Classification Search
CPC ........... H04R 2430/23; H04R 2430/21; H04R 2430/20; H04R 29/004; H04R 29/005; H04R 29/006; H04R 29/007; H04R 2499/13; G10L 25/78; G10L 25/81; G10L 25/84; G10K 11/175; G10K 2200/10; G10K 2210/3215
USPC .......... 381/86, 73.1, 71.4, 365, 110; 704/200, 704/206, 210
See application file for complete search history.

(56) References Cited

U.S. PATENT DOCUMENTS

| | | | | |
|---|---|---|---|---|
| 2003/0209893 A1* | 11/2003 | Breed et al. | ................... | 280/735 |
| 2007/0280486 A1* | 12/2007 | Buck et al. | ...................... | 381/92 |
| 2009/0055180 A1* | 2/2009 | Coon et al. | ..................... | 704/251 |
| 2009/0103749 A1* | 4/2009 | Goodwin | ......................... | 381/92 |
| 2011/0164761 A1* | 7/2011 | McCowan | ............. | H04R 3/005 381/92 |

OTHER PUBLICATIONS

Yilmaz, O. et al. "Blind Separation of Speech Mixtures via Time-Frequency Masking," IEEE Transactions on Signal Processing, Jul. 2004, pp. 1830-1847, vol. 52, No. 7.
Wang, D. "Time-Frequency Masking for Speech Separation and Its Potential for Hearing Aid Design," Trends in Amplification, pp. 332-353, vol. 12 No. 4, Dec. 2008.

* cited by examiner

*Primary Examiner* — Paul S Kim
*Assistant Examiner* — Sabrina Diaz
(74) *Attorney, Agent, or Firm* — Ingrassia Fisher & Lorenz, P.C.

(57) ABSTRACT

Methods and systems are provided for filtering sound. A position sensor determines positions of a plurality of occupants in a defined space. Multiple microphones receive sound and generate corresponding audio signals. A processor in communication with the microphones and the position sensor receives the positions of the occupants and the audio signals. The processor determines which of the occupants are engaging in speech and applies a temporal-spatial filter to the audio signals to generate a plurality of output signals corresponding respectively to each occupant of the defined space.

20 Claims, 6 Drawing Sheets

SYSTEMS AND METHODS FOR FILTERING SOUND IN A DEFINED SPACE

TECHNICAL FIELD

The technical field generally relates to speech recognition, and more particularly relates to separating the speech of multiple persons.

BACKGROUND

Modern vehicles, such as automobiles, often utilize speech recognition processes to accept audible input and commands from a driver or other occupants. For instance, a person may use audible commands to select entertainment options or participate in a mobile telephone conversation. However, when multiple persons are speaking either simultaneously in or short succession to one another, speech recognition performance is adversely affected, as it is difficult to distinguish the speech of one person from another.

Accordingly, it is desirable to provide improved methods and systems for separating speech signals. Furthermore, other desirable features and characteristics of the present invention will become apparent from the subsequent detailed description and the appended claims, taken in conjunction with the accompanying drawings and the foregoing technical field and background.

SUMMARY

A method is provided for filtering sound in a defined space. In one embodiment, the method includes receiving sound from within the defined space with a plurality of microphones. The method further includes determining positions of a plurality of occupants of the defined space and determining which of the occupants are engaging in speech. A plurality of audio signals corresponding to the received sound at each of said plurality of microphones are generated. The method further includes applying a temporal-spatial filter to the audio signals to generate a plurality of output signals corresponding respectively to each occupant of the defined space.

A system is provided for filtering sound in a defined space. In one embodiment, the system includes a position sensor configured to determine positions of a plurality of occupants in the defined space. The system also includes a plurality of microphones configured to receive sound from within the defined space and generate a plurality of audio signals corresponding to the received sound at each of the microphones. The system further includes at least one processor in communication with the microphones and the position sensor for receiving the positions of the plurality of occupants and the audio signals. The at least one processor is configured to determine which of the occupants are engaging in speech, apply a plurality of beamformers to the audio signals to direct a microphone beam toward each determined occupant position, generate a plurality of beamformer output signals corresponding respectively to each determined occupant position, and apply a time frequency mask to the plurality of beamformer output signals to generate a plurality of output signals corresponding respectively to each occupant of the defined space.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
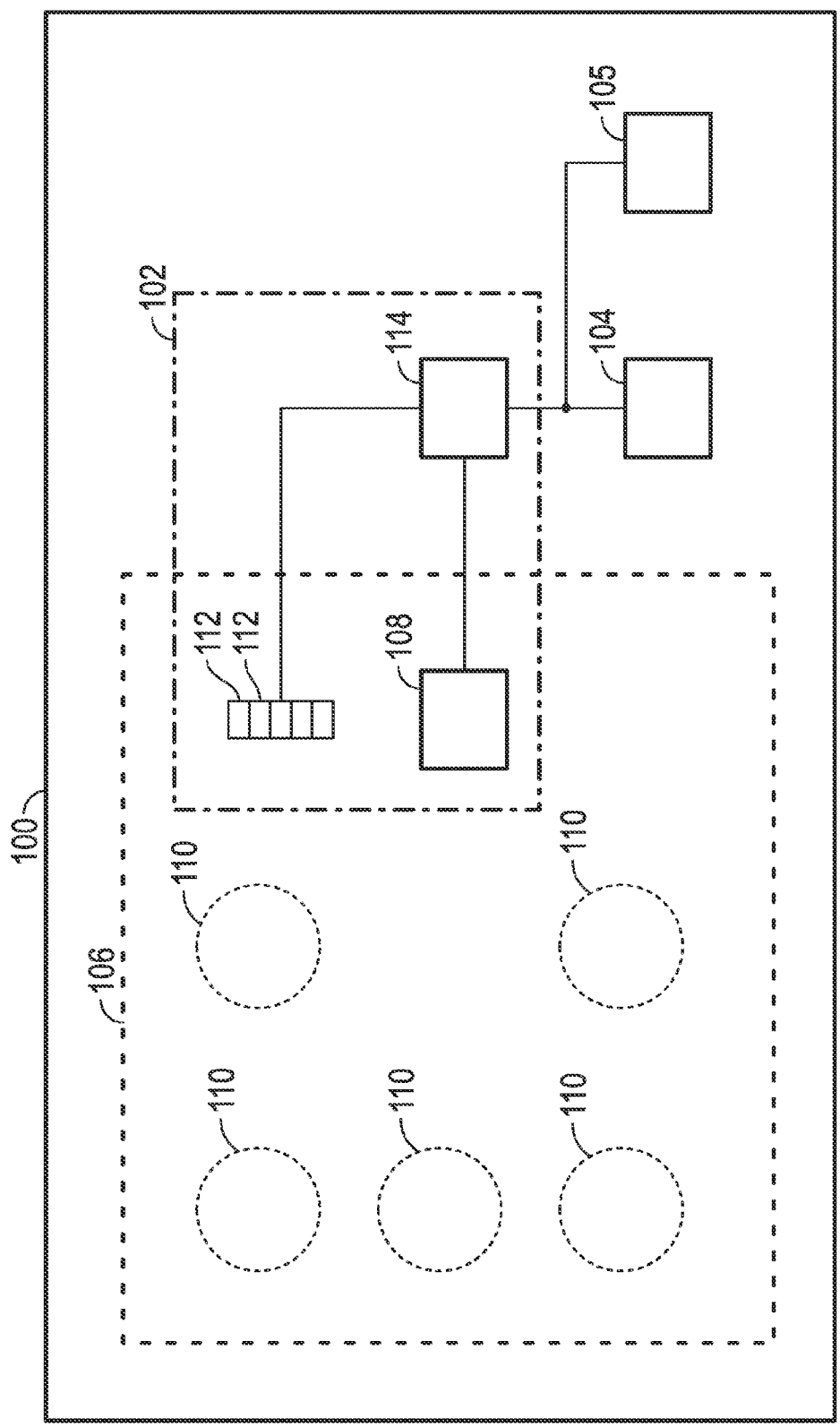
FIG. 1 is a block diagram of a vehicle including an audio system in accordance with an exemplary embodiment.

The following detailed description is merely exemplary in nature and is not intended to limit the application and uses. Furthermore, there is no intention to be bound by any expressed or implied theory presented in the preceding technical field, background, brief summary or the following detailed description.

Referring to the figures, wherein like numerals indicate like parts throughout the several views, a vehicle 100 having an audio system 102 for receiving desired sounds is shown herein. In the exemplary embodiments shown herein, the vehicle 100 is an automobile (not separately numbered) and the audio system 102 is coupled to a speech recognition system 104 for determining the words that are being spoken. However, the audio system 102 and/or the speech recognition system 104 described herein may be implemented and/or utilized in other types of vehicles 100 or in non-vehicle applications. For instance, other vehicles 100 may include, but are not limited to, aircraft (not shown). Non-vehicle applications include, but are not limited to, offices in a factory environment (not shown). Furthermore, instead of, or in addition to, the speech recognition system 104, the audio system 102 may be coupled to a telephony system 105. The telephony system 105 may be utilized to perform telecommunications with, e.g., a cellular telephone network (not shown). Those skilled in the art will appreciate other systems that may be coupled to the audio system 102.

With reference to FIG. 1, the vehicle 100 of the exemplary embodiments defines a defined space 106. Specifically, in the exemplary embodiments, the defined space 106 is a passenger compartment (not separately numbered) of the vehicle 100. The passenger compartment accommodates a plurality of individuals, i.e., occupants of the vehicle 100, e.g., a driver and at least one passenger. Of course, the system 102 may function when only one occupant 110 is within the passenger compartment.

The audio system 102 includes a position sensor 108. The position sensor 108 is configured to determine an occupant position of an occupant 110 within the defined space 106. In the exemplary embodiments, the position sensor 108 is configured to determine the position of each occupant 110. That is, the position sensor 108 is configured to determine a plurality of occupant positions of a plurality of occupants 110. Accordingly, the position sensor 108 may also determine the number of occupants 110. For instance, the position sensor 108 may be utilized to determine the position of any of a plurality of occupants 110. The position sensor 108 may be configured to repeatedly and/or continuously determine the position of the occupants 110 at any time the audio system 102 is in operation. As such, the position of each occupant 110 may be updated as the occupant 110 changes position within the defined space 106.

The position sensor 108 may be configured to specifically sense the position of the head of the occupant 110. The position sensor 108 is configured to even more specifically sense the position of the mouth of the occupant 110. As such, the occupant positions used hereafter may be considered as the position of the mouths of the occupants 110 of the vehicle 100.

Furthermore, and as described in greater detail below, the position sensor 108 of at least one of the exemplary embodiments described below, determines which of the occupants 110 is engaging in speech. Said another way, the position sensor 108 may be configured to determine which occupant 110 is talking. Said yet another way, the position sensor 108 may be configured to determine if the lips/mouth of each occupant 110 is moving.

In a first exemplary embodiment, the position sensor 108 utilizes sound waves in an ultrasonic range to determine the position of the occupant 110 of the vehicle 100. As such, sound waves in this range are outside that of typical human hearing and therefore will not distract the occupants and should not pose privacy concerns. Accordingly, the position sensor 108 may be referred to as an ultrasonic position sensor (not separately numbered).

Figure 2:
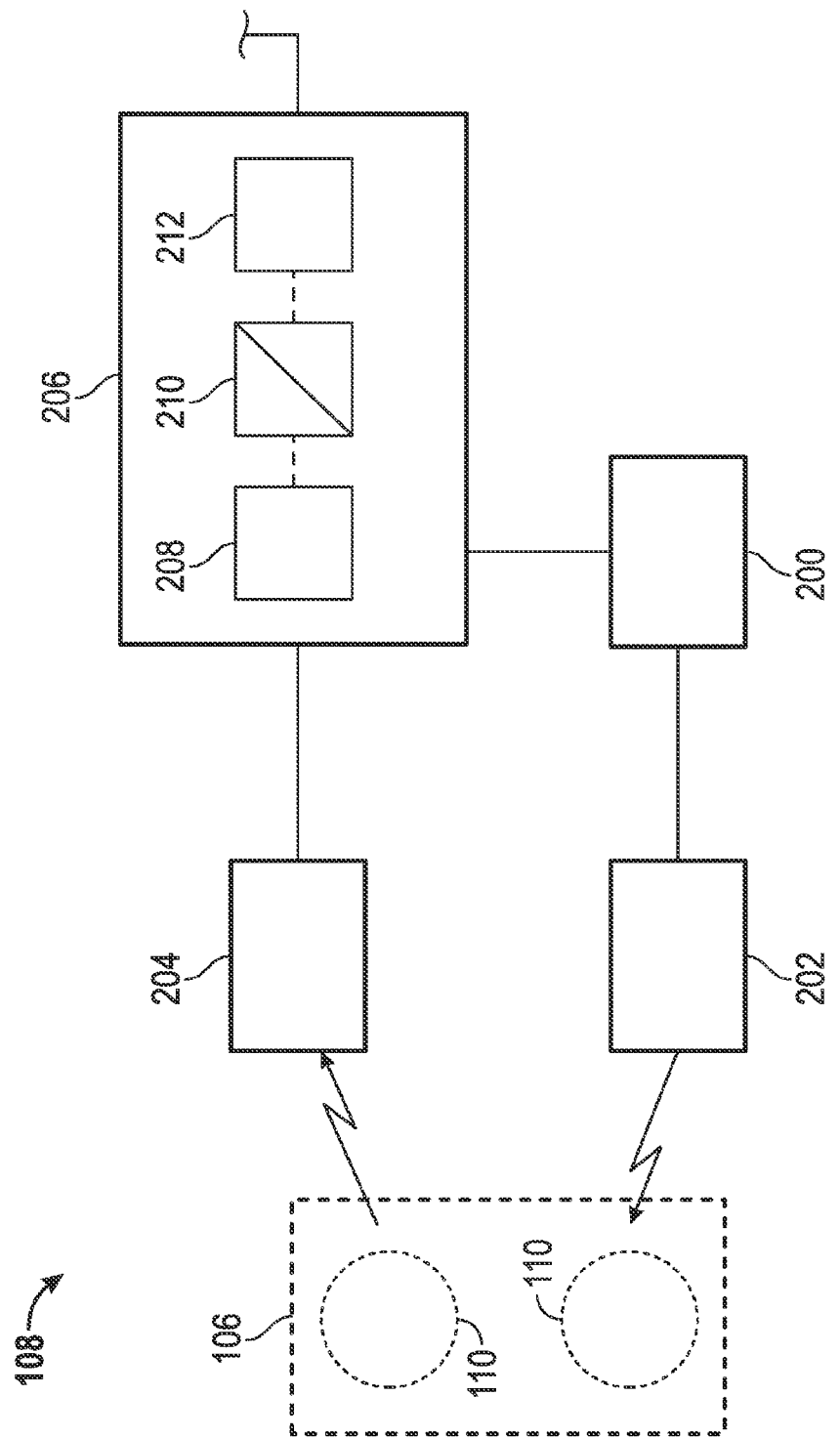
FIG. 2 is block diagram of a position sensor of the audio system in accordance with a first exemplary embodiment.

Referring now to FIG. 2, the position sensor 108 of the first exemplary embodiment includes a signal generator 200. The signal generator 200 may be configured to generate a high-voltage continuous wave ("CW") signal and/or a plurality of high-voltage pulses. Other types of signals may alternatively be generated by the signal generator 200 as appreciated by those skilled in the art. A plurality of ultrasonic transmitters 202 are electrically coupled to the signal generator 200. The ultrasonic transmitters 202, commonly referred to as transmitting transducers, generate sound waves in the ultrasonic range. The sound waves generated by the ultrasonic transmitters 202 correspond to the signal generated by the signal generator 200, and may be beamformed to propagate in a specific direction or be omni-directional. Specifically, in the first exemplary embodiment, the sound waves have a center frequency of about 100 kilohertz ("kHz") and an effective bandwidth of about 25 kHz. Of course, other suitable frequencies for the sound waves in the ultrasonic range will be realized by those skilled in the art.

The sound waves reflect off of objects disposed in the defined space 106 including the occupant 110. The position sensor 108 of the exemplary embodiments further includes a plurality of ultrasonic receivers 204 for receiving these reflected sound waves. Specifically, in the first exemplary embodiment, about 16 ultrasonic receivers 204 are utilized to receive the reflected sound waves; however, a different number of ultrasonic receivers 204 could be employed. The ultrasonic receivers 204, commonly referred to as transducer receivers, generate a plurality of received signals corresponding to the received reflected sound waves.

Although the above description of the ultrasonic transmitters 202 and receivers 204 may imply separate devices, the ultrasonic transmitters 202 and receivers 204 may be combined into one or more transceivers (not shown) as appreciated by those skilled in the art.

With continued reference to FIG. 2, the position sensor 108 also includes a processing unit 206 in communication with the ultrasonic receivers 204. The processing unit 206 receives the received signals from the ultrasonic receivers 204 and is configured to determine the position of the occupant 110 of the vehicle 100 as well as the number of occupants 110. More specifically, in the first exemplary embodiment, the processing unit 206 is configured to determine the position of the mouth of the occupants 110 of the vehicle 100.

The processing unit 206 may be configured to condition, filter, demodulate, and/or sample the reflected signals received by the ultrasonic receivers 204 to generate a processed signal. Specifically, the processing unit 206 of the first exemplary embodiment includes conditioning circuitry 208 coupled to the ultrasonic receivers 204, an analog-to-digital converter ("ADC") 210 coupled to the conditioning circuitry 208, and a microprocessor 212 coupled to the ADC 210. However, the specific design parameters of the processing unit 206 may vary as is realized by those skilled in the art.

The processing unit 206 may also be in communication with the signal generator 200. More specifically, the microprocessor 212 may be in communication with the signal generator 200 to control operation of the signal generator 200. Even more specifically, the signal generator 200 may be controlled to perform a scan of the positioning sensor field of view, time the pulsating transmission, and synchronize the transmission to the receivers 204.

The microprocessor 212 may be utilized to identify motion of the mouth of the occupant 110, which may indicate that the occupant 110 is engaging in speech. That is, the microprocessor 212 executes a speech activity detection program configured to determine that an occupant 110 is engaging in speech, the probability to the occupant 110 is engaging in speech, and/or the position of that occupant 110. Specifically, the processed signal may be further processed to search for spatio-temporal and velocity (Doppler based) distinguishing features that indicate mouth movement, and thus, an indication that the occupant 110 is speaking. For example, a lip movement of about 10 cm/second may generate a Doppler shift of approximately 300 Hz for ultrasonic wave centered at about 100 Khz. These relatively high speeds compared to head movements can indicate speech activity.

In a second exemplary embodiment, the position sensor 108 utilizes radio frequency ("RF") waves in an RF range to determine the position of the occupant 110 of the vehicle 100. Said another way, the position sensor 108 may utilize radar for determining the position of the occupant 110. Such RF waves are not visible or audible and therefore will not distract the occupants and should not pose privacy concerns. Accordingly, the position sensor 108 may be referred to as an RF position sensor (not separately numbered) or a radar position sensor.

Figure 3:
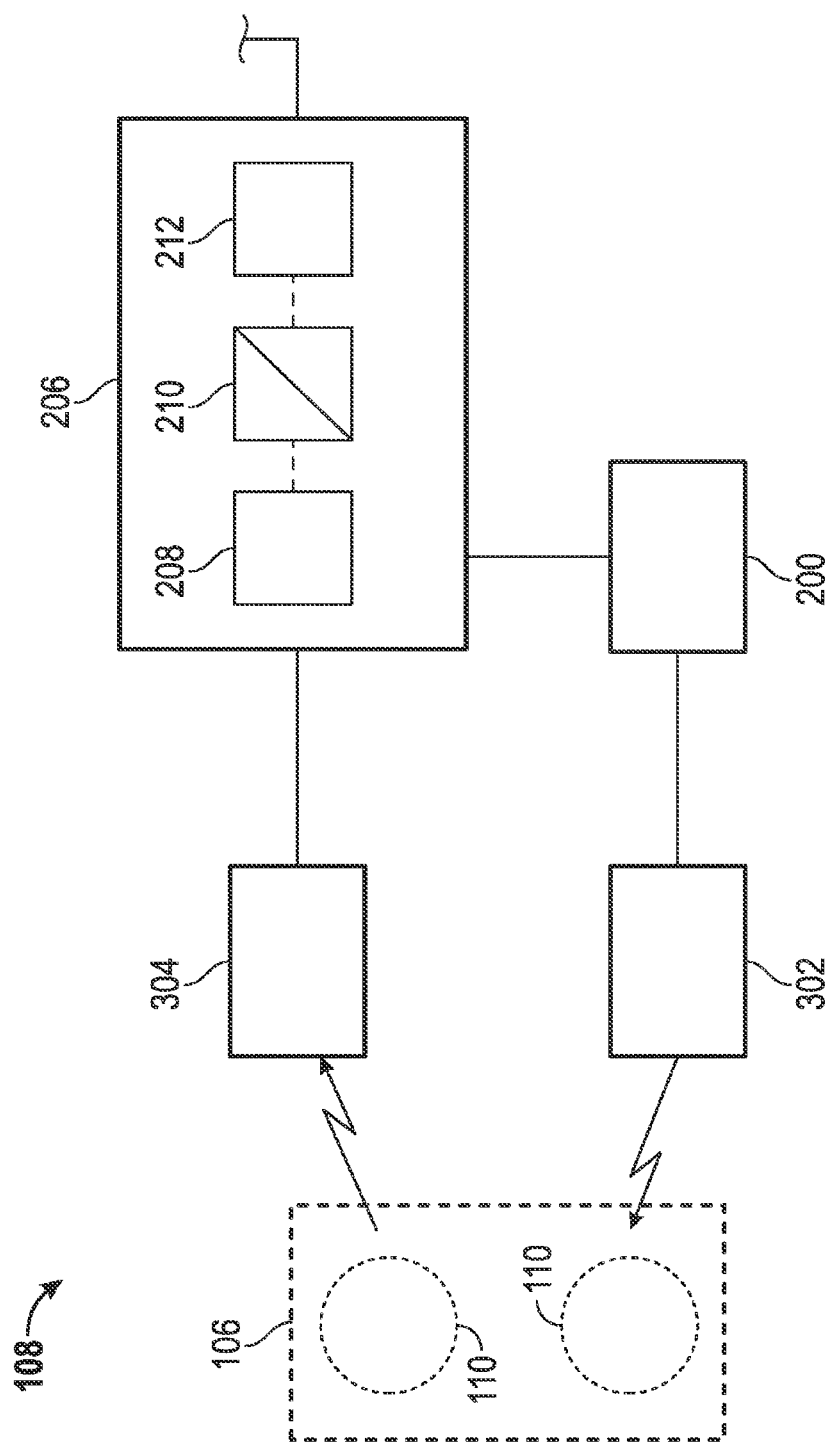
FIG. 3 is block diagram of the position sensor of the audio system in accordance with a second exemplary embodiment.

Referring now to FIG. 3, the position sensor 108 of the second exemplary embodiment includes the signal generator 200. A plurality of RF transmitters 302 are electrically coupled to the signal generator 200. The RF transmitters 302, commonly referred to as transmitters, generate the RF waves. The RF waves generated by the RF transmitters 302 correspond to the signal generated by the signal generator 200. The position sensor 108 of the second exemplary embodiment may utilize a linear frequency modulated ("LFM") CW signal or an ultra-wideband ("UWB") pulse signal. Such signals, having a bandwidth of about 4 Gigahertz ("GHz") at a transmission power on the order of milliwatts ("mW"), would be capable of achieving a resolution of about 4 centimeters ("cm"). Of course, other suitable configurations will be realized by those skilled in the art.

The RF waves reflect off of objects disposed in the defined space 106 including the occupant 110. The position sensor 108 of the second exemplary embodiment further includes a plurality of RF receivers 304 for receiving these reflected RF waves. The RF receivers 304, commonly referred to as transducer receivers, generate a plurality of received signals corresponding to the received reflected RF waves.

Although the above description of the RF transmitters 302 and receivers 304 may imply separate devices, the RF transmitters 302 and receivers 304 may be combined into one or more transceivers (not shown) as appreciated by those skilled in the art.

With continued reference to FIG. 3, the position sensor 108 also includes the processing unit 206 electrically coupled to the RF receivers 304. The processing unit 206 receives the received signals from the ultrasonic receivers 204 and is configured to determine the position of the occupant 110 of the vehicle 100 as well as the number of occupants 110. More specifically, in the second exemplary embodiment, the processing unit 206 is configured to determine the position of the mouth of the occupants 110. The processing unit 206 of the illustrated embodiment includes the conditioning circuitry 208 coupled to the RF receivers 204, the ADC 210 coupled to the conditioning circuitry 208, and the microprocessor 212 coupled to the ADC 210. However, the specific design parameters of the processing unit 206 may vary as is realized by those skilled in the art.

As with the first exemplary embodiments, the processing unit 206 of the second exemplary embodiment may also be in communication with the signal generator 200. More specifically, the microprocessor 212 may be in communication with the signal generator 200 to control operation of the signal generator 200. Even more specifically, the signal generator 200 may be controlled to perform a scan of the positioning sensor field of view, time the pulsating transmission, and synchronize the transmission to the receivers 304.

Figure 4:
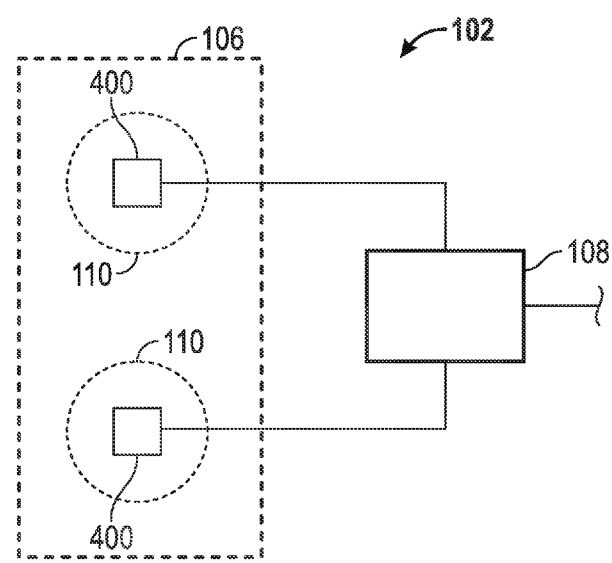
FIG. 4 is block diagram of the position sensor of the audio system in accordance with a third exemplary embodiment.

In a third exemplary embodiment, as shown in FIG. 4, the position sensor 108 may include one or more seat sensors 400. The seat sensor(s) 400 may be disposed in seats (not shown) of the vehicle 100 to detect the presence of the occupant 110. In the third exemplary embodiment, the seat sensors 400 may measure pressure changes that occur when an occupant 110 sits down in one of the seats. However, other techniques for implementing the seat sensors 400 may be realized by those skilled in the art.

The seat sensor(s) 400 may also be used in concert with the ultrasonic, radar, or camera configurations described above. As such, the seat sensor(s) 400 may be utilized in areas of the vehicle 100 that are obscured from the radar or camera configurations or to provide verification of the positions generated by the radar or camera configurations. Furthermore, the audio system 102 of this third exemplary embodiment may also utilize anthropometric data in concert with the seat sensors 400 to determine head and/or mouth position of the occupant 110. For example, the system 102 may have access to height information of the occupant 110, particularly the driver. With that height information, combined with the pressure sensor data indicating the presence of the occupant 110 and/or seat position data, the system 102 of this embodiment is configured to calculate the position of the mouth the occupant 110.

In another exemplary embodiment (not shown), the position sensor 108 utilizes infrared waves to determine the position of the occupant of the vehicle. For example, the position sensor 108 may include a camera (not shown) with an infrared light source (not shown).

The processing unit 206 of the exemplary embodiments is further configured to transmit various data, including, but not limited to, the number of occupants in the defined space, the positions of the occupants (i.e., the occupant positions), and which of the occupants is speaking.

Referring again to FIG. 1, the audio system 100 further includes a plurality of microphones 112. Each microphone 112 is configured to receive sound from within the defined space. The microphones 112 may be positioned adjacent one another, e.g., in a microphone array. However, in other embodiments (not shown), the microphones 112 may be distributed in other configurations.

The audio system 102 of the exemplary embodiments also includes a processor 114. The processor 114 may comprise a microprocessor, microcontroller, application specific integrated circuit, and/or other suitable device able to perform calculations and/or execute programs or other instructions. The processor 114 is in communication with the position sensor 108 and the microphones 112. As such, the processor 114 is configured to receive the occupant position and other data from the position sensor 108 as well as audio signals 115 from the microphones 112. However, it should be appreciated that the position sensor 108, and the processing unit 206 of the position sensor 108, may be properly integrated with the processor 114, such that multiple computational devices are not needed.

Figure 5:
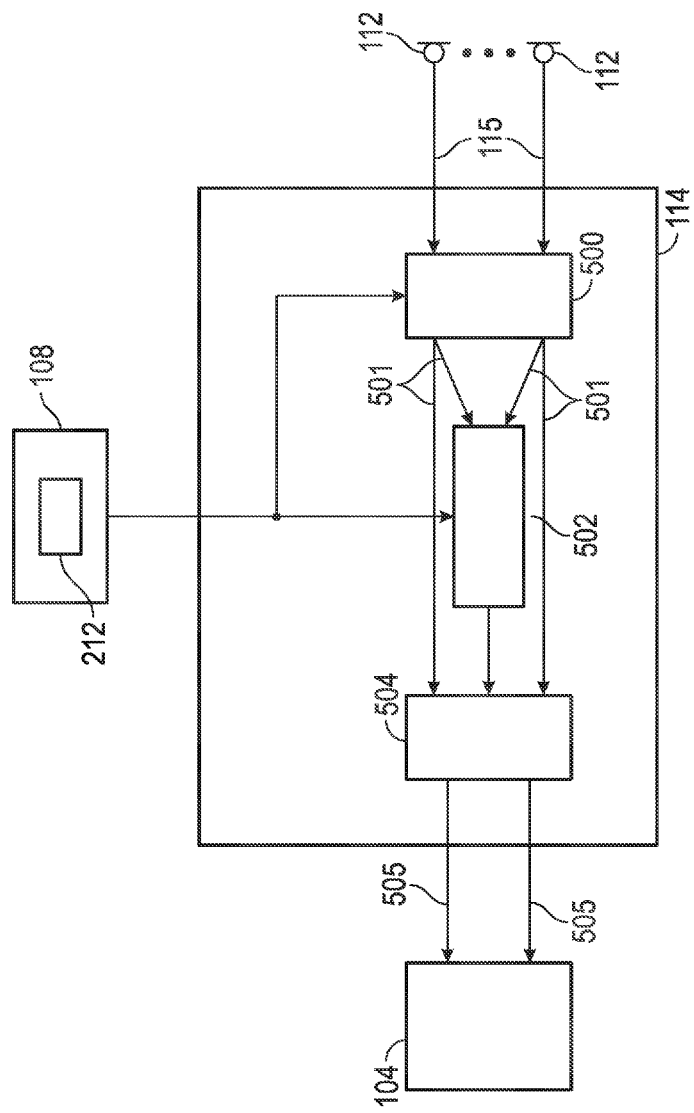
FIG. 5 is a block diagram of a processor of the audio system in accordance with an exemplary embodiment.

The processor 114 is configured to apply a temporal-spatial filter (not separately labeled) to the audio signals 115 received from the microphones 112. In an exemplary embodiment, as shown in FIG. 5, the processor 114 is configured to apply a plurality of beamformers 500 to the audio signals 115 received from the microphones 112. As is appreciated by those skilled in the art, beamforming is a spatial signal filtering technique which can control the directionality of reception by modifying the phase and amplitude of the received signals at each microphone 112. The beamformers 500 of the exemplary embodiment are implemented as software in the processor 114 and are not necessarily separate hardware components.

Specifically, the beamformers 500 of the audio system 100 directs a microphone beam toward each occupant position, as determined by the position sensors 108. That is, the processor 114 utilizes the occupant position data in the beamforming processes. In the exemplary embodiments, the beamformers 500 are fixed beamformers that each form the beam solely on the position data provided by the position sensor 108. Of course, the position data may be updated continuously as described above. As such, the beamformer may change the direction of the microphone beam as the mouth of the speaking occupant moves. The beamformers 500 generate a plurality of beamformer output signals 501, with each output signal 501 corresponding to one of the occupants 110.

The processor 114 also includes a time frequency mask calculator 502 for calculating a time frequency domain mask. The time frequency mask calculator 502 of the exemplary embodiments is implemented as software in the processor 114 and is not a separate hardware component. The time-frequency mask calculator 502 is in communication with the beamformers 500 and configured to receive the plurality of beamformer output signals 501. The time-frequency mask calculator 502 is also in communication with the microprocessor 212 of the position sensor 108 to receive data regarding which occupants 112 are currently speaking.

As stated previously, the microprocessor 212 of the position sensor 108 is configured to identify motion of the mouth of the occupant to determine which occupants 112 are currently speaking. It assumed that any individual time-frequency slot is dominated by the speaking of a single occupant 112. Therefore, a single occupant 112 is assigned to each non-silent time-frequency slot by the microprocessor 212 in a time frequency map.

The processor 114 further includes a source estimator 504 in communication with the beamformers 500 and the time-frequency mask calculator 502. The source estimator 504 of the exemplary embodiments is implemented as software in the processor 114 and is not a separate hardware component. The source estimator 504 applies an auditory mask in the frequency domain. Specifically, the source estimator 504 recovers the signals of the occupants 112 from the beamformer outputs by using the previously calculated time frequency calculations. Application of the source estimator 504 enhances at least one of the plurality of beamformer output signals 501 based on which occupant 110 or occupants 110 are speaking. The source estimator 504 outputs a plurality of speaker signals 505 with each speaker signal corresponding to one of the occupants 110 of the defined space 106.

In the exemplary embodiment, the speech recognition system 104 is in communication with the processor 114. More specifically, the speech recognition system 104 receives the plurality of speaker signals 505 from the processor 114.

By utilizing the audio system 102 and methods described above to process the sound received by the microphones 112, the speech of multiple occupants 110 may be discerned, even if those occupants 110 are speaking simultaneously or in rapid succession. This allows for the speech recognition system 104 to utilize the speech provided by each occupant 110 with any of multiple applications. Said another way, the audio system 102 and methods allow for greater collaboration between the occupants 110 in utilizing the speech recognition system 104. As such, multiple occupants 110 may provide input to the speech recognition system 104.

Figure 6:
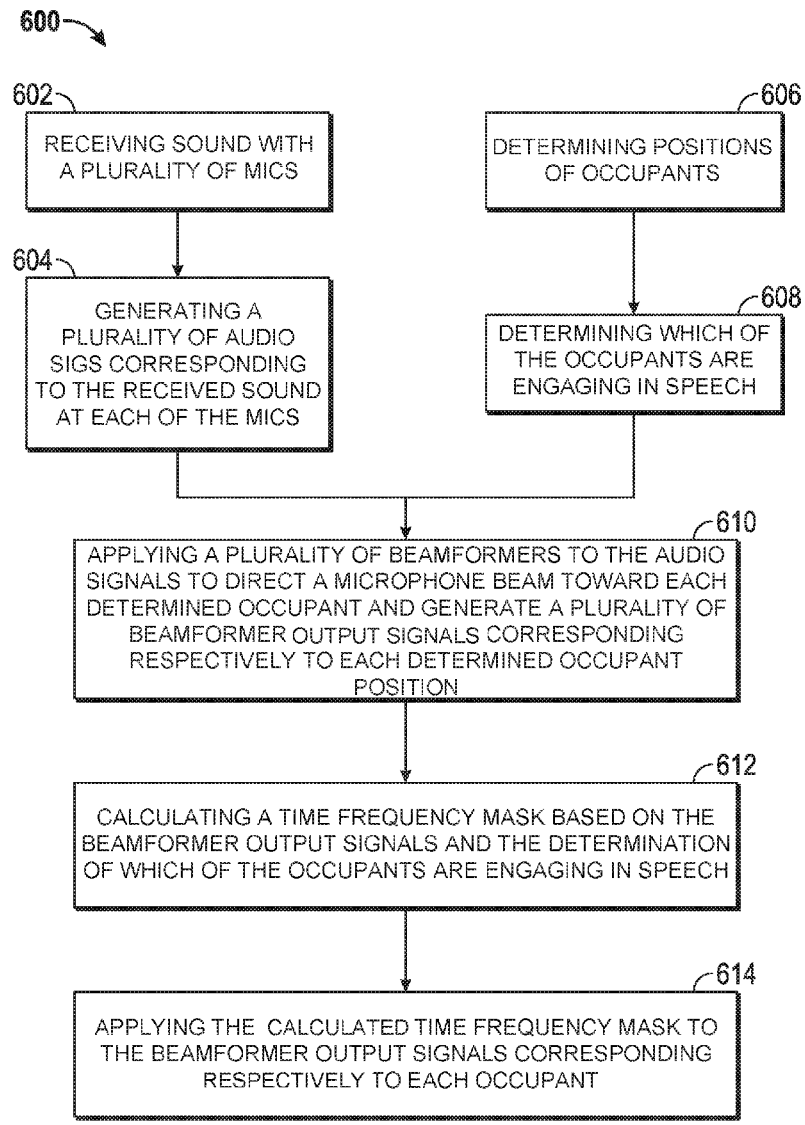
FIG. 6 is a flowchart of a method for filtering sound in a defined space according to an exemplary embodiment.

The exemplary system 100 described above describes an exemplary method 600, which is reproduced in FIG. 6. The method 600 includes the step 602 of receiving sound from within the defined space 106 with a plurality of microphones 112. The method 600 further includes the step 604 of generating a plurality of audio signals 115 corresponding to the received sound at each of the microphones 112. The method 600 also includes the steps 606, 608 of determining positions of a plurality of occupants 110 of the defined space 106 and determining which of the occupants 110 are engaging in speech.

The audio signals 115, positions of the occupants 110, and determination of which occupants 110 are engaging in speech are then utilized. The method 600 includes the step (not separately labeled) of applying a temporal-spatial filter to the audio signals to generate a plurality of output signals corresponding respectively to each occupant of the defined space. In the exemplary embodiment, this applying of the temporal-spatial filter is accomplished with the steps 610 and 612. Specifically, step 610 includes applying a plurality of beamformers 500 to the audio signals 115 to direct a microphone beam toward each determined occupant 110 and generate a plurality of beamformer output signals 501 corresponding respectively to each determined occupant 110 position. Step 612 includes calculating a time frequency mask based on the beamformer output signals 501 and the determination of which of the occupants 110 are engaging in speech. The method 600 further includes the step 614 of applying the calculated time frequency mask to the beamformer output signals 501 corresponding respectively to each occupant of the defined space 106.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of filtering sound in a defined space, comprising:
    receiving sound from within the defined space with a plurality of microphones;
    determining positions of a plurality of occupants of the defined space;
    determining which of the occupants are engaging in speech;
    generating a plurality of audio signals corresponding to the received sound at each of said plurality of microphones; and
    applying a temporal-spatial filter to the audio signals to generate a plurality of output signals corresponding respectively to each occupant of the defined space, wherein the applying of the temporal-spatial filter comprises:
        applying a plurality of beamformers to the audio signals to direct a microphone beam toward each determined occupant position and generate a plurality of beamformer output signals corresponding respectively to each determined occupant position; and
        applying a time frequency mask to the plurality of beamformer output signals to generate the plurality of output signals corresponding respectively to each occupant of the defined space, wherein the time frequency mask is calculated based at least in part on a determination of whether or not each occupant of the defined space is engaging in speech using a position sensor.

2. The method as set forth in claim 1, further comprising sending the plurality of output signals to a speech recognition system.

3. The method as set forth in claim 1, wherein determining an occupant position comprises:
    transmitting waves in an ultrasonic range with a plurality of transmitters;
    receiving reflected waves in the ultrasonic range; and
    analyzing signals corresponding to the transmitted and reflected waves to determine the occupant position.

4. The method as set forth in claim 1, wherein determining an occupant position comprises:
    transmitting waves in a radio frequency (RF) range with a plurality of transmitters;
    receiving reflected waves in the RF range; and
    analyzing signals corresponding to the transmitted and reflected waves to determine the occupant position.

5. The method as set forth in claim 1 wherein determining an occupant position comprises analyzing seat sensor data from at least one seat sensor.

6. The method of claim 1, wherein the determination of whether or not each occupant of the defined space is engaging in speech is based at least in part on a measure of facial movement using the position sensor.

7. The method of claim 1, wherein the determination of whether or not each occupant of the defined space is engaging in speech is based at least in part on a measure of lip movement using the position sensor.

8. A system for filtering sound in a defined space, comprising:
    a position sensor configured to determine positions of a plurality of occupants in the defined space;
    a plurality of microphones configured to receive sound from within the defined space and generate a plurality of audio signals corresponding to the received sound at each of said microphones; and at least one processor in communication with the microphones and the position sensor for receiving the positions of the plurality of occupants and the audio signals, said at least one processor configured to determine which of the occupants are engaging in speech, apply a plurality of beamformers to the audio signals to direct a microphone beam toward each determined occupant position, generate a plurality of beamformer output signals corresponding respectively to each determined occupant position, and apply a time frequency mask to the plurality of beamformer output signals to generate a plurality of output signals corresponding respectively to each occupant of the defined space, wherein the time frequency mask is calculated by the processor based at least in part on a determination of whether or not each occupant of the defined space is engaging in speech using the position sensor.

9. The system as set forth in claim 8, wherein said position sensor comprises:
a signal generator;
a plurality of ultrasonic transmitters electrically coupled to said signal generator and configured to generate sound waves in the ultrasonic range;
a plurality of ultrasonic receivers for receiving reflected sound waves in the ultrasonic range and generating a plurality of received signals corresponding to the received reflected sound waves; and
a processing unit electrically coupled to said ultrasonic receivers and said processor and configured to receive the received signals, determine the occupant position, and provide the occupant position to said processor.

10. The system as set forth in claim 9, wherein said position sensor is configured to identify motion of a mouth of at least one of the occupants engaging in speech by searching for distinguishing features in spatio-temporal and/or velocity features of signals corresponding to the reflected sound waves.

11. The system as set forth in claim 8, wherein said position sensor comprises:
a signal generator;
a plurality of RF transmitters electrically coupled to said signal generator for generating RF waves in the RF range;
a plurality of RF receivers for receiving reflected RF waves in the RF range and generating a plurality of received signals corresponding to the received reflected RF waves; and
a processing unit electrically coupled to said RF receivers and said processor and configured to receive the received signals, determine the occupant position, and provide the occupant position to said processor.

12. The system as set forth in claim 11, wherein said position sensor is configured to identify motion of a mouth of at least one the occupants engaging in speech by searching for distinguishing features in spatio-temporal and/or velocity features of signals corresponding to the reflected RF waves.

13. The system as set forth in claim 8, wherein said position sensor comprises a camera.

14. The system of claim 8, wherein:
the position sensor is configured to measure facial movement of the occupants; and
the at least one processor is configured to determine whether or not each occupant of the defined space is engaging in speech using the measured facial movement.

15. The system of claim 8, wherein:
the position sensor is configured to measure lip movement of the occupants; and
the at least one processor is configured to determine whether or not each occupant of the defined space is engaging in speech using the measured lip movement.

16. A vehicle, comprising:
a passenger compartment; and
an audio system comprising
a position sensor configured to determine positions of a plurality of occupants in a defined space;
a plurality of microphones configured to receive sound from within the defined space and generate a plurality of audio signals corresponding to the received sound at each of said microphones; and
at least one processor in communication with the microphones and the position sensor for receiving the positions of the plurality of occupants and the audio signals;
said at least one processor configured to determine which of the occupants are engaging in speech, apply a plurality of beamformers to the audio signals to direct a microphone beam toward each determined occupant position, generate a plurality of beamformer output signals corresponding respectively to each determined occupant position, and apply a time frequency mask to the plurality of beamformer output signals to generate a plurality of output signals corresponding respectively to each occupant of the defined space, wherein the time frequency mask is calculated by the at least one processor based at least in part on a determination of whether or not each occupant of the defined space is engaging in speech using the position sensor.

17. The vehicle as set forth in claim 16, wherein said position sensor is configured to identify motion of a mouth of at least one of the occupants engaging in speech by searching for distinguishing features in spatio-temporal and/or velocity features.

18. The vehicle as set forth in claim 16, wherein said position sensor comprises:
a signal generator;
a plurality of ultrasonic transmitters electrically coupled to said signal generator and configured to generate sound waves in the ultrasonic range;
a plurality of ultrasonic receivers for receiving reflected sound waves in the ultrasonic range and generating a plurality of received signals corresponding to the received reflected sound waves; and
a processing unit electrically coupled to said ultrasonic receivers and said processor and configured to receive the received signals, determine the occupant position, and provide the occupant position to said processor.

19. The vehicle as set forth in claim 16, wherein said position sensor comprises:
a signal generator;
a plurality of RF transmitters electrically coupled to said signal generator for generating RF waves in the RF range;
a plurality of RF receivers for receiving reflected RF waves in the RF range and generating a plurality of received signals corresponding to the received reflected RF waves; and
a processing unit electrically coupled to said RF receivers and said processor and configured to receive the received signals, determine the occupant position, and provide the occupant position to said processor.

20. The vehicle of claim 16, wherein:
the position sensor is configured to measure facial movement of the occupants; and
the at least one processor is configured to determine whether or not each occupant of the defined space is engaging in speech using the measured facial movement.

* * * * *